United States Patent
Grusy et al.

(10) Patent No.: US 9,483,408 B1
(45) Date of Patent: Nov. 1, 2016

(54) DEFERRED METADATA INITIALIZATION

(71) Applicant: INTERNATIONAL BUSINESS MACHINES CORPORATION, Armonk, NY (US)

(72) Inventors: Ellen J. Grusy, Tucson, AZ (US); Lokesh M. Gupta, Tucson, AZ (US); Kurt A. Lovrien, Tucson, AZ (US); Kenneth W. Todd, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 39 days.

(21) Appl. No.: 14/682,619

(22) Filed: Apr. 9, 2015

(51) Int. Cl.
*G06F 12/08* (2016.01)

(52) U.S. Cl.
CPC ... *G06F 12/0866* (2013.01); *G06F 2212/1021* (2013.01); *G06F 2212/313* (2013.01); *G06F 2212/608* (2013.01)

(58) Field of Classification Search
CPC .................................................. G06F 12/0866
USPC ............... 711/133, 111, 112, 114, 156, 170, 711/E12.009; 707/813, 999.206
See application file for complete search history.

(56) References Cited

U.S. PATENT DOCUMENTS

| | | | | |
|---|---|---|---|---|
| 5,897,661 A * | 4/1999 | Baranovsky | .......... | G06F 3/0608 707/999.202 |
| 7,340,652 B2 * | 3/2008 | Jarvis | .................. | G06F 11/1435 707/999.202 |
| 7,383,404 B2 * | 6/2008 | Barnes | .................. | G06F 3/0605 709/222 |
| 7,472,312 B2 * | 12/2008 | Jarvis | .................. | G06F 11/1435 707/999.202 |
| 7,930,588 B2 | 4/2011 | Blount et al. | | |
| 7,975,169 B2 * | 7/2011 | Ash | ...................... | G06F 11/1441 714/6.2 |
| 8,001,339 B1 * | 8/2011 | Holdman | .............. | G06F 3/0607 711/156 |
| 8,271,548 B2 * | 9/2012 | Prahlad | ............. | G06F 17/30528 707/812 |
| 8,332,581 B2 * | 12/2012 | Candelaria | ........ | G06F 17/30067 711/112 |
| 8,359,491 B1 * | 1/2013 | Bloomstein | ......... | G06F 11/1662 714/6.3 |
| 8,380,961 B2 * | 2/2013 | Grusy | ................... | G06F 3/0638 707/822 |
| 8,578,087 B2 * | 11/2013 | Acedo | ................... | G06F 3/0605 711/112 |
| 8,656,096 B2 * | 2/2014 | Acedo | ................... | G06F 3/0605 711/112 |
| 8,719,501 B2 * | 5/2014 | Flynn | .................. | G06F 12/0246 711/103 |
| 8,856,467 B2 * | 10/2014 | Mahar | ................... | G06F 3/0605 711/156 |
| 8,914,605 B2 * | 12/2014 | Grusy | ................... | G06F 3/0638 707/822 |
| 9,009,118 B2 * | 4/2015 | Flick | ................. | G06F 17/30749 707/690 |
| 9,116,988 B2 * | 8/2015 | Flick | ................. | G06F 17/30817 |
| 2005/0055372 A1 * | 3/2005 | Springer | ........... | G06F 17/30997 |
| 2005/0257097 A1 * | 11/2005 | Jarvis | .................. | G06F 11/1435 714/42 |
| 2007/0294589 A1 * | 12/2007 | Jarvis | .................. | G06F 11/1435 714/42 |
| 2010/0153617 A1 * | 6/2010 | Miroshnichenko | ..... | G06F 3/061 711/6 |
| 2010/0161897 A1 * | 6/2010 | Lee | ......................... | G06F 3/061 711/112 |
| 2012/0102042 A1 * | 4/2012 | Flick | ................. | G06F 17/30817 707/746 |
| 2012/0102078 A1 * | 4/2012 | Flick | ................. | G06F 17/30817 707/825 |
| 2014/0101396 A1 | 4/2014 | Bonanno et al. | | |
| 2014/0173223 A1 | 6/2014 | Deneui et al. | | |

\* cited by examiner

*Primary Examiner* — Stephen Elmore
(74) *Attorney, Agent, or Firm* — Griffiths & Seaton PLLC

(57) ABSTRACT

Various embodiments for initializing metadata in a computing storage environment by a processor. A Release Generation Number (RGN) is associated with a volume, and an RGN is associated with a metadata track. Upon a release of storage space in the volume, the RGN associated with the volume is incremented. Upon an initialization of the metadata track, the RGN associated with the metadata track is updated to be consistent in generation with the RGN associated with the volume. Upon an access of the metadata track, the RGN of the metadata track is compared against the RGN of the volume, and the metadata track is initialized if a match is not found.

21 Claims, 3 Drawing Sheets

DEFERRED METADATA INITIALIZATION

BACKGROUND OF THE INVENTION

1. Field of the Invention

The present invention relates in general computing systems, and more particularly to, systems and methods for increased data management efficiency in computing storage environments.

2. Description of the Related Art

In today's society, computer systems are commonplace. Computer systems may be found in the workplace, at home, or at school. Computer systems may include data storage systems, or disk storage systems, to process and store data. Contemporary computer storage systems are known to destage, and subsequently, demote storage tracks from cache to long-term storage devices so that there is sufficient room in the cache for data to be written.

SUMMARY OF THE INVENTION

Various embodiments for initializing metadata in a computing storage environment by a processor are provided. A Release Generation Number (RGN) is associated with a volume, and an RGN is associated with a metadata track. Upon a release of storage space in the volume, the RGN associated with the volume is incremented. Upon an initialization of the metadata track, the RGN associated with the metadata track is updated to be consistent in generation with the RGN associated with the volume. Upon an access of the metadata track, the RGN of the metadata track is compared against the RGN of the volume, and the metadata track is initialized if a match is not found.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
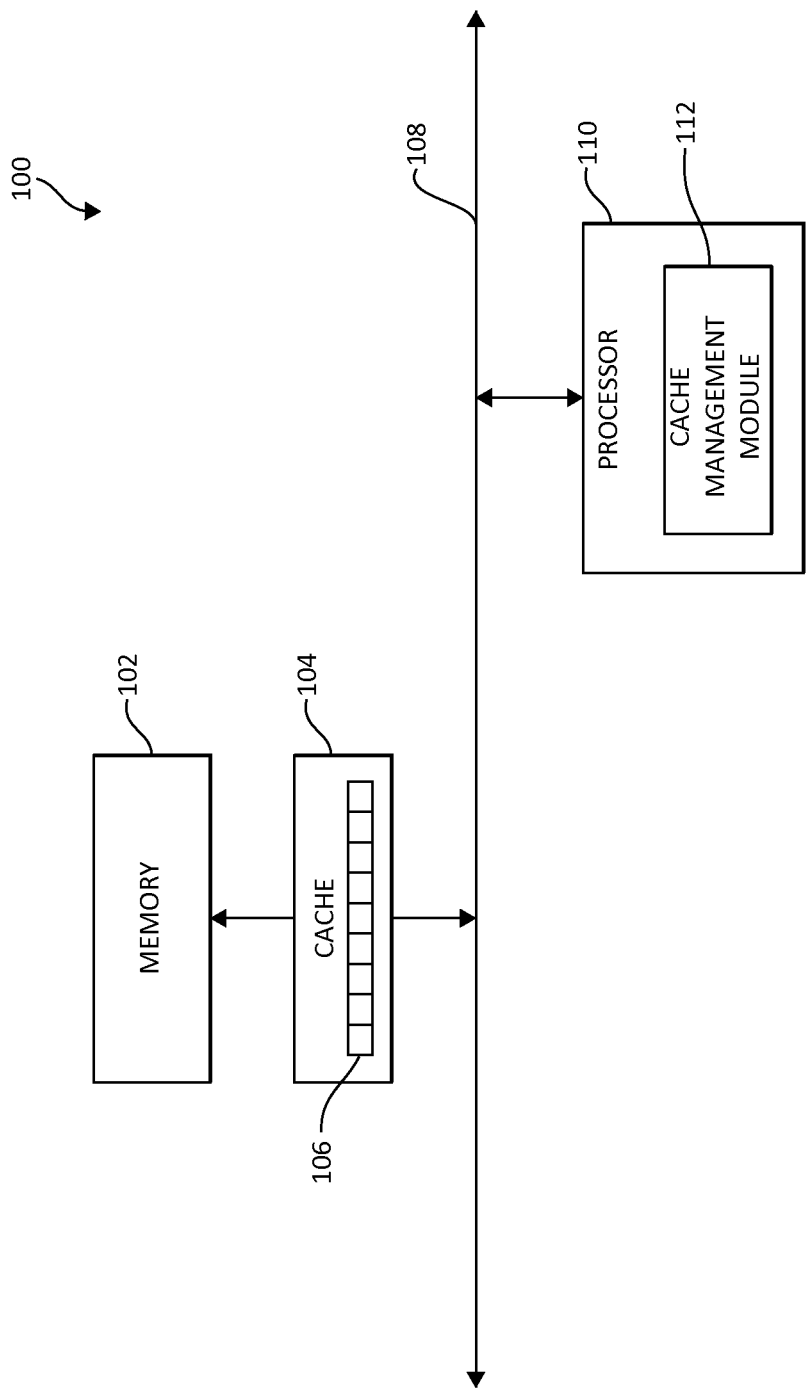
FIG. 1 is an exemplary block diagram showing a hardware structure in which aspects of the present invention may be realized.

A storage controller, among other computing components, retains metadata to describe the location and properties of data, such as the data's format. This metadata may be cached, along with the data itself, in order for faster performance of the storage controller. One metadata track may include information for many individual data tracks. For example, metadata describing Count Key Data (CKD) information may include on average, information pertaining to a thousand data tracks.

Initialization of this metadata currently may take a lengthy amount of time, as each metadata track needs to be written to storage. If the metadata is initialized as part of space released on a volume, then this space releasing process may also take a lengthy amount of time to complete. If the space is released as part of a data replication operation, such as flash copy establish, then these commands may time out. Space release operations, if drawn out, may degrade the performance of the computing storage environment by typing up resources, for example. A need exists for a mechanism whereby metadata initialization operations are not directly tied to storage space release operations.

The mechanisms of the illustrated embodiments separate the metadata initialization operations normally tied to storage space release operations from those release operations. In one exemplary embodiment, the mechanisms mark the volumes in a persistent state that require metadata track invalidation, and returns success to the client. In a subsequent step, the metadata is asynchronously invalidated for the volume. Once the metadata invalidation process is complete, the persistent state of the volume is restored. Any metadata accesses during the time the volume is in the aforementioned "metadata invalidation required" state will rebuild the metadata by examining associated customer data.

To asynchronously invalidate metadata according to the embodiments of the present invention, several exemplary portions of functionality may be implemented as will be further described. First, a Release Generation Number (RGN) may be associated with the storage volume and with every metadata track. Upon every release space operation, the RGN may be incremented. Further, upon metadata initialization, the RGN in the track is updated with the current RGN of the volume. Finally, for example, on a metadata access or metadata stage operation, the generation information of an instant metadata track is compared with the applicable generation information from the volume, here again by comparing the RGN of the metadata track to the RGN of the volume at a particular time. If the RGN information does not match, the metadata track is initialized.

By separating space release operations from those operations initializing metadata tracks, the space release operations, and consequently, metadata initialization operations, encumber less storage resources by, for example, completing in less time. The overall performance of the computing environment is thereby increased.

Turning to FIG. 1, a block diagram of one embodiment of a system 100 for data management incorporating various aspects of the present invention is illustrated. At least in the illustrated embodiment, system 100 comprises a memory 102 coupled to a cache 104 and a processor 110 via a bus 108 (e.g., a wired and/or wireless bus).

Memory 102 may be any type of memory device known in the art or developed in the future. Examples of memory 102 include, but are not limited to, an electrical connection having one or more wires, a portable computer diskette, a hard disk, a random access memory (RAM), an erasable programmable read-only memory (EPROM or Flash memory), an optical fiber, a portable compact disc read-only memory (CD-ROM), an optical storage device, a magnetic storage device, or any suitable combination of the foregoing. In the various embodiments of memory 102, storage tracks are capable of being stored in memory 102. Furthermore, each of the storage tracks can be staged or destaged from/to memory 102 from cache 104 when data is written to the storage tracks.

Cache 104, in one embodiment, comprises a write cache partitioned into one or more ranks 106, where each rank 106 includes one or more storage tracks. Cache 104 may be any cache known in the art or developed in the future.

During operation, the storage tracks in each rank 106 are destaged to memory 102 in a foreground destaging process after the storage tracks have been written to. That is, the foreground destage process destages storage tracks from the rank(s) 106 to memory 102 while a host (not shown) is actively writing to various storage tracks in the ranks 106 of cache 104. Ideally, a particular storage track is not being destaged when one or more hosts desire to write to the particular storage track, which is known as a destage conflict.

In various embodiments, processor 110 comprises or has access to a cache/data management module 112, which comprises computer-readable code that, when executed by processor 110, causes processor 110 to perform data management operations in accordance with aspects of the illustrated embodiments. In the various embodiments, processor 110 acts to initializing metadata in a computing storage environment by a processor. In furtherance of this metadata initialization, processor 110 may implement a Release Generation Number (RGN) that is associated with a volume, and an RGN is associated with a metadata track. Upon a release of storage space in the volume, the processor 110 may increment the RGN associated with the volume. Upon an initialization of the metadata track, the processor 110 may update the RGN associated with the metadata track to be consistent in generation with the RGN associated with the volume. Upon an access of the metadata track, the processor 110 may compare the RGN of the metadata track against the RGN of the volume, and the metadata track may then be initialized if a match is not found.

Processor 110, in other embodiments, assigns an RGN for each of a plurality of volumes and metadata tracks in the computing storage environment.

In other embodiments, processor 110, pursuant to incrementing the RGN associated with the volume, hardens, on a disk associated with the volume, generation information from the RGN.

In other embodiments, processor 110, pursuant to updating the RGH, updates a control block associated with the metadata track with generation information from the RGN.

In other embodiments, processor 110, if a match is found, saves generation information from the RGN of the metadata track in a control block associated with the metadata track.

In still other embodiments, processor 110, in conjunction with the access of the metadata track, if the metadata is not found in cache, stages the metadata track to cache.

Finally, in other embodiments, processor 110, in conjunction with initializing the metadata, marks the metadata as modified in cache.

Figure 2:
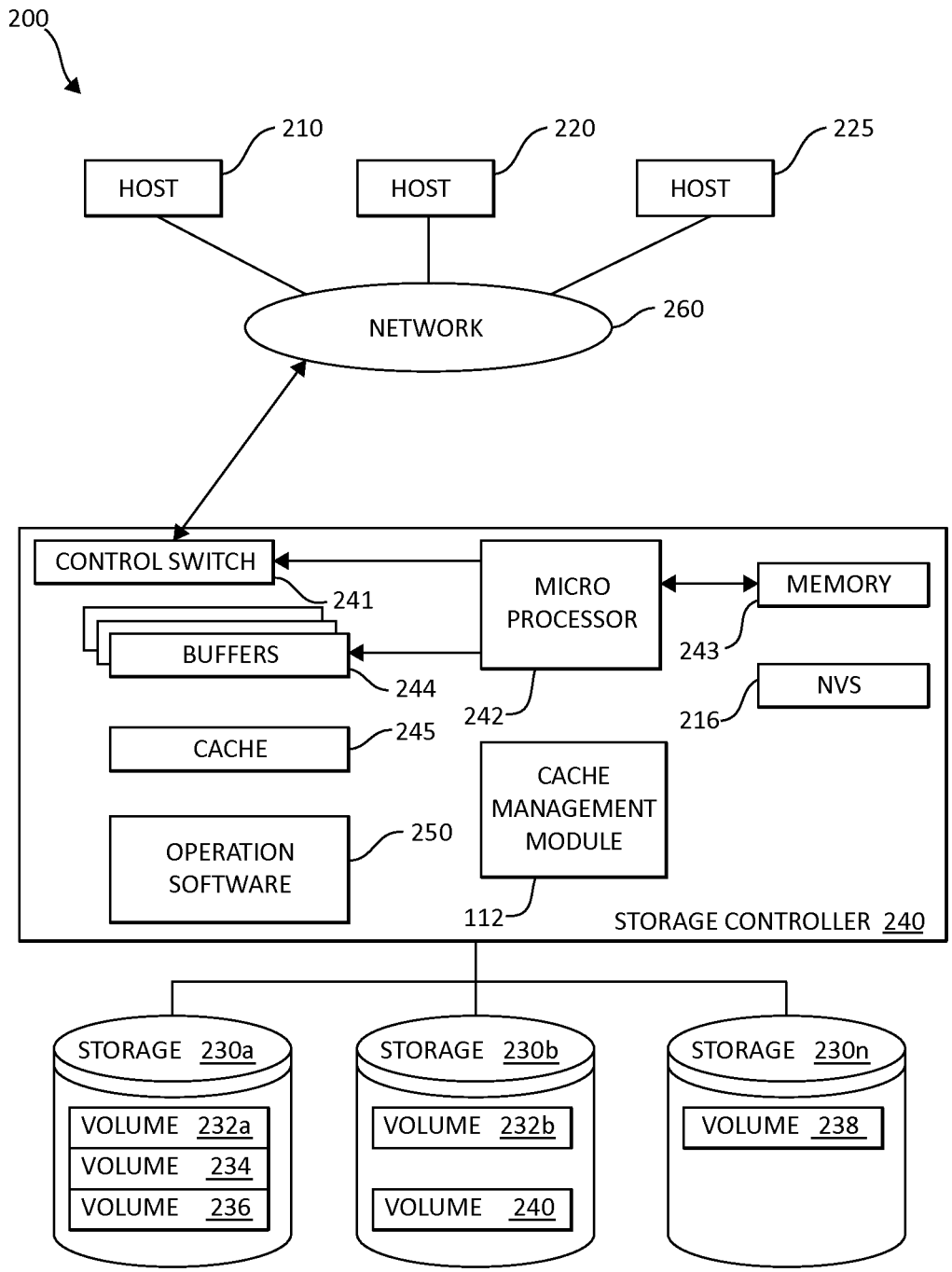
FIG. 2 is an exemplary block diagram showing a hardware structure of a data storage system in a computing environment, again in which aspects of the present invention may be realized.

FIG. 2 is a block diagram 200 illustrating an exemplary hardware structure of a data storage system in which aspects of the present invention may be implemented. Host computers 210, 220, 225, are shown, each acting as a central processing unit for performing data processing as part of a data storage system 200. The cluster hosts/nodes (physical or virtual devices), 210, 220, and 225 may be one or more new physical devices or logical devices to accomplish the purposes of the present invention in the data storage system 200. A Network (e.g., storage fabric) connection 260 may be a fibre channel fabric, a fibre channel point-to-point link, a fibre channel over ethernet fabric or point to point link, a FICON or ESCON I/O interface. The hosts, 210, 220, and 225 may be local or distributed among one or more locations and may be equipped with any type of fabric (or fabric channel) (not shown in FIG. 2) or network adapter 260 to the storage controller 240, such as Fibre channel, FICON, ESCON, Ethernet, fiber optic, wireless, or coaxial adapters. Data storage system 200 is accordingly equipped with a suitable fabric (not shown in FIG. 2) or network adapter 260 to communicate. Data storage system 200 is depicted in FIG. 2 comprising storage controllers 240 and cluster hosts 210, 220, and 225. The cluster hosts 210, 220, and 225 may include cluster nodes.

To facilitate a clearer understanding of the methods described herein, storage controller 240 is shown in FIG. 2 as a single processing unit, including a microprocessor 242, system memory 243 and nonvolatile storage ("NVS") 216, which will be described in more detail below. It is noted that in some embodiments, storage controller 240 is comprised of multiple processing units, each with their own processor complex and system memory, and interconnected by a dedicated network within data storage system 200. Moreover, given the use of the storage fabric network connection 260, additional architectural configurations may be employed by using the storage fabric 260 to connect multiple storage controllers 240 together with one or more cluster hosts 210, 220, and 225 connected to each storage controller 240.

In some embodiments, the system memory 243 of storage controller 240 includes operation software 250 and stores program instructions and data which the processor 242 may access for executing functions and method steps associated with executing the steps and methods of the present invention. As shown in FIG. 2, system memory 243 may also include or be in communication with a cache 245, also referred to herein as a "cache memory", for buffering "write data" and "read data", which respectively refer to write/read requests and their associated data. In one embodiment, cache 245 is allocated in a device external to system memory 243, yet remains accessible by microprocessor 242 and may serve to provide additional security against data loss, in addition to carrying out the operations as described herein.

In some embodiments, cache 245 may be implemented with a volatile memory and non-volatile memory and coupled to microprocessor 242 via a local bus (not shown in FIG. 2) for enhanced performance of data storage system 200. The NVS 216 included in data storage controller is accessible by microprocessor 242 and serves to provide additional support for operations and execution as described in other figures. The NVS 216, may also referred to as a "persistent" cache, or "cache memory" and is implemented with nonvolatile memory that may or may not utilize external power to retain data stored therein. The NVS may be stored in and with the cache 245 for any purposes suited to accomplish the objectives of the present invention. In some embodiments, a backup power source (not shown in FIG. 2), such as a battery, supplies NVS 216 with sufficient power to retain the data stored therein in case of power loss to data storage system 200. In certain embodiments, the capacity of NVS 216 is less than or equal to the total capacity of cache 245.

The storage controller 240 may include a cache management module 112. The cache management module 112 may incorporate internal memory (not shown) in which the destaging algorithm may store unprocessed, processed, or "semi-processed" data. The cache management module 112 may work in conjunction with each and every component of the storage controller 240, the hosts 210, 220, 225, and other storage controllers 240 and hosts 210, 220, and 225 that may be remotely connected via the storage fabric 260. Cache management module 112 may be structurally one complete module or may be associated and/or included with other individual modules. Cache management module 112 may also be located in the cache 245 or other components of the storage controller 240.

The storage controller 240 includes a control switch 241 for controlling a protocol to control data transfer to or from the host computers 210, 220, 225, a microprocessor 242 for controlling all the storage controller 240, a nonvolatile control memory 243 for storing a microprogram (operation software) 250 for controlling the operation of storage controller 240, cache 245 for temporarily storing (buffering) data, and buffers 244 for assisting the cache 245 to read and write data, and the cache management module 112, in which information may be set. The multiple buffers 244 may be implemented to assist with the methods and steps as described herein.

Figure 3:
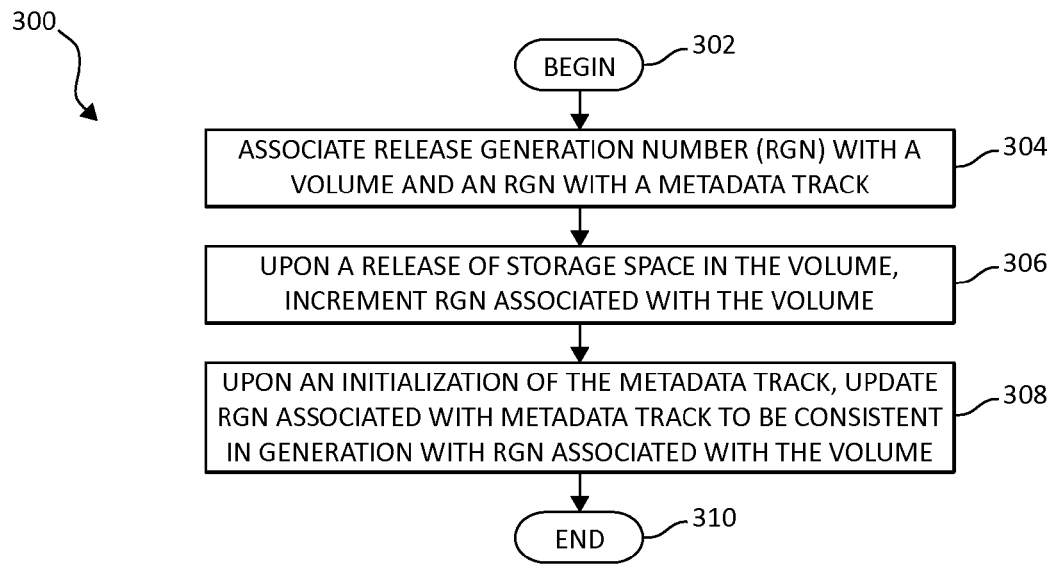
FIG. 3 is a flow chart diagram illustrating an exemplary method for deferred metadata initialization in a computing storage environment, again in which aspects of the present invention may be realized.

Turning now to FIG. 3, a flow chart diagram, illustrating a generalized method 300 for data management, featuring aspects of metadata invalidation in accordance with the present invention, is depicted. Method 300 begins (step 302). A Release Generation Number (RGN) is associated with a volume. In addition, a RGN is associated with each metadata track in the volume (step 304). Upon a release of storage space in the volume, the RGN associated with the volume is incremented (step 306). Upon an initialization of the metadata track, the RGN associated with the metadata track is updated to be consistent in generation with the RGN associated with the volume (step 308). The method 300 then ends (step 310).

Figure 4:
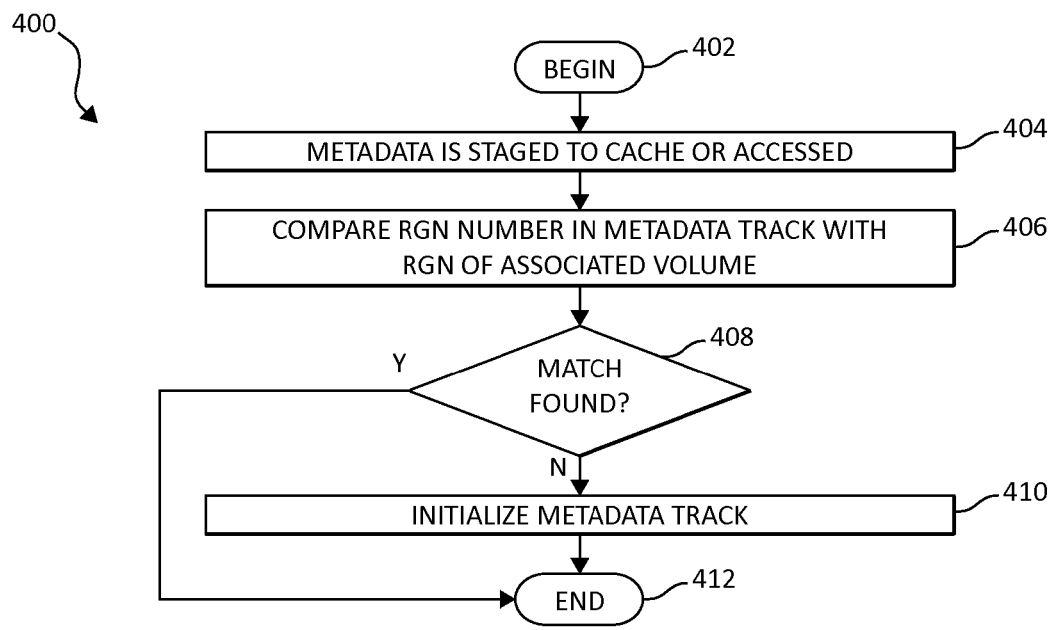
FIG. 4 is a flow chart diagram of an additional exemplary method for deferred metadata initialization in a computing storage environment according to the present invention.

FIG. 4, following, is a flow chart diagram illustrating additional exemplary metadata initialization functionality according to various aspects of the present invention. Method 400 begins (step 402) with the stage of an applicable metadata track to cache or an access of an applicable metadata track (step 404). The RGN number of in the metadata track is compared with the RGN of the volume that the metadata track is associated (step 406). If no match is found (i.e., the generations of the metadata track and the volume are inconsistent), the metadata track is initialized (step 410). The method 400 ends (step 412). Returning to step 408, if a match is found, the method 400 ends (again, step 412).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A method for initializing metadata in a computing storage environment by a processor, comprising:
    associating a Release Generation Number (RGN) with a volume and an RGN with a metadata track;
    upon a release of storage space in the volume, incrementing the RGN associated with the volume; and
    upon an initialization of the metadata track, updating the RGN associated with the metadata track to be consistent in generation with the RGN associated with the volume;
        wherein upon an access of the metadata track, the RGN of the metadata track is compared against the RGN of the volume, and the metadata track is initialized if a match is not found.

2. The method of claim 1, further including assigning an RGN for each of a plurality of volumes and metadata tracks in the computing storage environment.

3. The method of claim 1, wherein incrementing the RGN associated with the volume further includes hardening, on a disk associated with the volume, generation information from the RGN.

4. The method of claim 1, wherein updating the RGN further includes updating a control block associated with the metadata track with generation information from the RGN.

5. The method of claim 1, wherein if a match is found, generation information from the RGN of the metadata track is saved in a control block associated with the metadata track.

6. The method of claim 1, further including, in conjunction with the access of the metadata track, if the metadata is not found in cache, staging the metadata track to cache.

7. The method of claim 1, further including, in conjunction with initializing the metadata, marking the metadata as modified in cache.

8. A system for initializing metadata in a computing storage environment, comprising:
    a processor, operable in the computing storage environment, wherein the processor:
        associates a Release Generation Number (RGN) with a volume and an RGN with a metadata track;
        upon a release of storage space in the volume, increments the RGN associated with the volume; and
        upon an initialization of the metadata track, updates the RGN associated with the metadata track to be consistent in generation with the RGN associated with the volume;
            wherein upon an access of the metadata track, the RGN of the metadata track is compared against the RGN of the volume, and the metadata track is initialized if a match is not found.

9. The system of claim 8, wherein the processor assigns an RGN for each of a plurality of volumes and metadata tracks in the computing storage environment.

10. The system of claim 8, wherein the processor, pursuant to incrementing the RGN associated with the volume, hardens, on a disk associated with the volume, generation information from the RGN.

11. The system of claim 8, wherein the processor, pursuant to updating the RGN, updates a control block associated with the metadata track with generation information from the RGN.

12. The system of claim 8, wherein if a match is found, the processor saves generation information from the RGN of the metadata track in a control block associated with the metadata track.

13. The system of claim 8, wherein the processor, in conjunction with the access of the metadata track, if the metadata is not found in cache, stages the metadata track to cache.

14. The system of claim 8, wherein the processor, in conjunction with initializing the metadata, marks the metadata as modified in cache.

15. A computer program product initializing metadata in a computing storage environment by a processor, the computer program product comprising a non-transitory computer-readable storage medium having computer-readable program code portions stored therein, the computer-readable program code portions comprising:
    a first executable portion that associates a Release Generation Number (RGN) with a volume and an RGN with a metadata track;
    a second executable portion that, upon a release of storage space in the volume, increments the RGN associated with the volume; and
    a third executable portion that, upon an initialization of the metadata track, updates the RGN associated with the metadata track to be consistent in generation with the RGN associated with the volume;

wherein upon an access of the metadata track, the RGN of the metadata track is compared against the RGN of the volume, and the metadata track is initialized if a match is not found.

16. The computer program product of claim 15, further including a fourth executable portion that assigns an RGN for each of a plurality of volumes and metadata tracks in the computing storage environment.

17. The computer program product of claim 15, further including a fourth executable portion that, pursuant to incrementing the RGN associated with the volume, hardens, on a disk associated with the volume, generation information from the RGN.

18. The computer program product of claim 15, further including a fourth executable portion that, pursuant to updating the RGN, updates a control block associated with the metadata track with generation information from the RGN.

19. The computer program product of claim 15, further including a fourth executable portion that, if a match is found, saves generation information from the RGN of the metadata track in a control block associated with the metadata track.

20. The computer program product of claim 15, further including a fourth executable portion that, in conjunction with the access of the metadata track, if the metadata is not found in cache, stages the metadata track to cache.

21. The computer program product of claim 15, further including a fourth executable portion that, in conjunction with initializing the metadata, marks the metadata as modified in cache.

* * * * *